United States Patent
Seo et al.

(10) Patent No.: US 9,265,033 B2
(45) Date of Patent: Feb. 16, 2016

(54) METHOD FOR RECEIVING DOWNLINK SIGNAL AND METHOD FOR TRANSMITTING SAME, AND DEVICE FOR RECEIVING SAME AND DEVICE FOR TRANSMITTING SAME

(75) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 14/003,400

(22) PCT Filed: Mar. 5, 2012

(86) PCT No.: PCT/KR2012/001609
§ 371 (c)(1),
(2), (4) Date: Sep. 5, 2013

(87) PCT Pub. No.: WO2012/124917
PCT Pub. Date: Sep. 20, 2012

(65) Prior Publication Data
US 2013/0343340 A1    Dec. 26, 2013

Related U.S. Application Data

(60) Provisional application No. 61/451,611, filed on Mar. 11, 2011.

(51) Int. Cl.
*H04W 72/04* (2009.01)
*H04L 5/00* (2006.01)
*H04L 25/03* (2006.01)
*H04L 27/26* (2006.01)

(52) U.S. Cl.
CPC ............. *H04W 72/04* (2013.01); *H04L 5/0048* (2013.01); *H04L 27/2613* (2013.01); *H04L 5/0023* (2013.01); *H04L 25/03866* (2013.01)

(58) Field of Classification Search
None
See application file for complete search history.

(56) References Cited

U.S. PATENT DOCUMENTS

| | | | |
|---|---|---|---|
| 2008/0225965 A1* | 9/2008 | Pi et al. | 375/260 |
| 2010/0080137 A1 | 4/2010 | Vedantham et al. | |
| 2010/0195615 A1 | 8/2010 | Lee et al. | |
| 2011/0019776 A1 | 1/2011 | Zhang et al. | |
| 2011/0194511 A1* | 8/2011 | Chen et al. | 370/329 |
| 2011/0211595 A1* | 9/2011 | Geirhofer et al. | 370/478 |
| 2012/0176884 A1* | 7/2012 | Zhang et al. | 370/203 |

OTHER PUBLICATIONS

NEC Group, "Reference signals for demodulating R-PDCCH channel", TSG-RAN WG1#59Bis Valencia, Spain, Jan. 18-22, 2010, XP050418309, R1-100309, pp. 1-5.
Nokia Siemens Networks, Nokia, "On DL Backhaul Control Channel Design Aspects", 3GPP TSG-RAN WG1 Meeting #61 Montreal, Canada, May 10-14, 2010, XP050420080, R1-102969, pp. 1-5.

* cited by examiner

*Primary Examiner* — Diane Lo
(74) *Attorney, Agent, or Firm* — Birch, Stewart, Kolasch & Birch, LLP

(57) ABSTRACT

The present invention relates to a method for a transmission device to transmit data and a reference signal for demodulation for the data, to a reception device. The transmission device of the present invention appropriately configures the reference signal for demodulation of the data being transmitted to the reception device by the transmission device, and transmits the reference signal to the reception device with the data. According to embodiments of the present invention, the demodulation performance for the data transmitted from the transmission device to the reception device is enhanced.

8 Claims, 9 Drawing Sheets

METHOD FOR RECEIVING DOWNLINK SIGNAL AND METHOD FOR TRANSMITTING SAME, AND DEVICE FOR RECEIVING SAME AND DEVICE FOR TRANSMITTING SAME

CROSS REFERENCE TO RELATED APPLICATIONS

This non-provisional application is a National Stage entry under U.S.C. §371 of International Application No. PCT/KR2012/001609 filed on Mar. 05, 2012, which claims the benefit of U.S. Provisional Application No. 61/451,611 filed on Mar. 11, 2011. The entire contents of all of the above applications are hereby incorporated by reference.

TECHNICAL FIELD

The present invention relates to a wireless communication system and, more particularly, to a method for transmitting/receiving a downlink signal and an apparatus therefor.

BACKGROUND ART

In a wireless communication system, a transmitting device transmits a signal through a radio frequency channel. In this case, unexpected distortion may occur in the transmission signal. In addition, the transmitting device may precode the transmission signal and transmit the precoded signal to a receiving device. To efficiently receive/detect an original signal, the receiving device requires information about the radio channel, information about interference with respect to the transmission signal, and/or information for demodulating the transmission signal. The receiving device may correct distortion generated in the transmission signal using the above information, thereby obtaining the original signal with higher accuracy.

For this, a scheme in which the transmitting device appropriately configures channel measurement and/or a demodulation reference signal, a scheme in which the transmitting device transmits the reference signal to a receiving device, and a scheme in which the receiving device receives the reference signal need to be defined.

DISCLOSURE

Technical Problem

In order for a receiving device to accurately demodulate a signal transmitted by a transmitting device, the transmitting device needs to appropriately configure a reference signal for demodulating the signal transmitted by the transmitting device and transmit the reference signal to the receiving device.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for receiving a downlink signal at a receiving device in a wireless communication system, including receiving downlink data and a demodulation reference signal in a subframe from a transmitting device; and demodulating the downlink data using the demodulation reference signal, wherein the downlink data is received in a resource block in one slot (hereinafter, a first resource block) of two slots constituting the subframe and the demodulation reference signal is received in the first resource block and a resource block in the other slot (hereinafter, a second resource block) of the two slots.

In another aspect of the present invention, provided herein is a method for transmitting a downlink signal at a transmitting device in a wireless communication system, including transmitting downlink data and a demodulation reference signal in a subframe to a receiving device, wherein the downlink data is transmitted in a resource block in one slot (hereinafter, a first resource block) of two slots constituting the subframe and the demodulation reference signal is transmitted in the first resource block and a resource block in the other slot (hereinafter, a second resource block) of the two slots.

In another aspect of the present invention, provided herein is a receiving device for receiving a downlink signal in a wireless communication system, including a radio frequency (RF) unit configured to receive downlink data and a demodulation reference signal in a subframe from a transmitting device; and a processor configured to control the RF unit, wherein the processor controls the RF unit to receive the downlink data in a resource block in one slot (hereinafter, a first resource block) of two slots constituting the subframe and controls the RF unit to receive the demodulation reference signal in the first resource block and a resource block in the other slot (hereinafter, a second resource block) of the two slots.

In another aspect of the present invention, provided herein is a transmitting device for transmitting a downlink signal in a wireless communication system, including a radio frequency (RF) unit configured to transmit downlink data and a demodulation reference signal in a subframe to a receiving device; and a processor configured to control the RF unit, wherein the processor controls the RF unit to transmit the downlink data in a resource block in one slot (hereinafter, a first resource block) of two slots constituting the subframe and controls the RF unit to transmit the demodulation reference signal in the first resource block and a resource block in the other slot (hereinafter, a second resource block) of the two slots.

In each aspect of the present invention, the first and second resource blocks may include a prescribed number of same consecutive subcarriers, or the first and second resource blocks may include a prescribed number of different consecutive subcarriers and have a same virtual resource block index.

In each aspect of the present invention, the demodulation reference signal may be transmitted using a scrambling ID or an antenna port allocated to the receiving device from the transmitting device to the receiving device.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, demodulation performance for data transmitted by a transmitting device to a receiving device can be improved.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
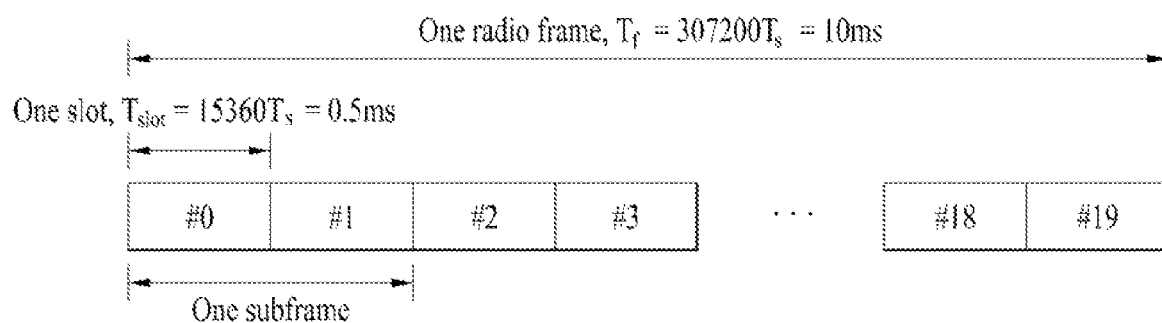
FIG. 1 is a view illustrating an exemplary structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a Node-B (NB), an evolved-NodeB (eNB), a base transceiver system (BTS), an access point (AP), or a processing server (PS). Moreover, in the present invention, a relay refers to a device and/or a point for extending a service area of a BS and providing a smooth service of the BS in a shadow area. The relay may be referred to as a relay node (RN) or a relay station (RS). In terms of a UE, the relay is a portion of a radio access network and operates like a BS except in some cases. A BS that transmits signals to the relay or receives signals from the relay is called a donor BS. The relay is connected to the donor BS wirelessly. In terms of the BS, the relay operates like the UE except in some cases (e.g. the case in which downlink control information is transmitted through an R-PDCCH, not through a PDCCH). Accordingly, the relay includes both a physical layer entity used for communication with the UE and a physical layer entity used for communication with the donor entity. Transmission from the BS to the relay, hereinafter referred to as BS-to-RN transmission, occurs in a downlink subframe and transmission from the relay to the BS, hereinafter referred to as RN-to-BS transmission, occurs in an uplink subframe. Meanwhile, BS-to-RN transmission and RN-to-BS transmission occur in a downlink frequency band and RN-to-BS transmission and UE-to-RN transmission occur in an uplink frequency band. In the present invention, the relay or UE may communicate with a network to which one or more BSs belong through the one or more BSs.

In the present invention, a physical downlink control channel (PDCCH), a physical control format indicator channel (PCFICH), a physical hybrid automatic retransmit request indicator channel (PHICH), and a physical downlink shared channel (PDSCH) may indicate a set of time-frequency resources or resource elements (REs) carrying downlink control information (DCI), a control format indicator (CFI), downlink acknowledgement (ACK)/negative ACK (NACK), and downlink data, respectively. In the present invention, a time-frequency resource or resource element (RE) that is assigned to or pertains to PDCCH/PCFICH/PHICH/PDSCH is referred to as a PDCCH/PCFICH/PHICH/PDSCH RE or a PDCCH/PCFICH/PHICH/PDSCH resource. Therefore, in the present invention, PDCCH/PCFICH/PHICH/PDSCH transmission by a BS may be identically interpreted as downlink data/control information transmission on PDCCH/PCFICH/PHICH/PDSCH, respectively.

In addition, in the present invention, a cell-specific reference signal (CRS)/demodulation reference signal (DMRS)/channel state information reference signal (CSI-RS) time-frequency resource (or RE) indicates an RE that is allocated to or available to CSR/DMRS/CSI-RS or a time-frequency resource (or RE) carrying a CRS/DMRS/CSI-RS. A subcarrier including a CRS/DMRS/CSI-RS RE is referred to as a CRS/DMRS/CSI-RS subcarrier and an orthogonal frequency division multiplexing (OFDM) symbol including the CRS/DMRS/CSI-RS RE is referred to as a CRS/DMRS/CSI-RS symbol.

FIG. 1 illustrates an exemplary structure of a radio frame used in a wireless communication system. Specifically, FIG. 1 illustrates the structure of a radio frame according to 3GPP LTE(-A). The structure of the frame of FIG. 1 may be applied to frequency division duplex (FDD) mode, half FDD (H-FDD) mode, and time division multiplex (TDD) mode.

Referring to FIG. 1, a 3GPP LTE(-A) radio frame is 10 ms ($307200T_s$) in duration. The radio frame is divided into 10 subframes of equal size. Subframe numbers may be assigned to the 10 subframes within one radio frame, respectively. $T_s$ denotes sampling time, where $T_s=1/(2048\times15$ kHz). Each subframe is 1 ms long and is further divided into two slots. 20 slots are sequentially numbered from 0 to 19 per radio frame. Duration of each slot is 0.5 ms. A time interval in which one subframe is transmitted is defined as a transmission time interval (TTI). Time resources may be distinguished by radio frame numbers (or radio frame indexes), subframe numbers (or subframe indexes), slot numbers (or slot indexes), and the like.

The radio frame may have different configurations according to duplex mode. In FDD mode for example, since downlink transmission and uplink transmission are discriminated according to frequency, a radio frame includes either downlink subframes or uplink subframes.

On the other hand, in TDD mode, since downlink transmission and uplink transmission are discriminated according to time, the frame includes both the downlink subframes and the uplink subframes.

Figure 2:
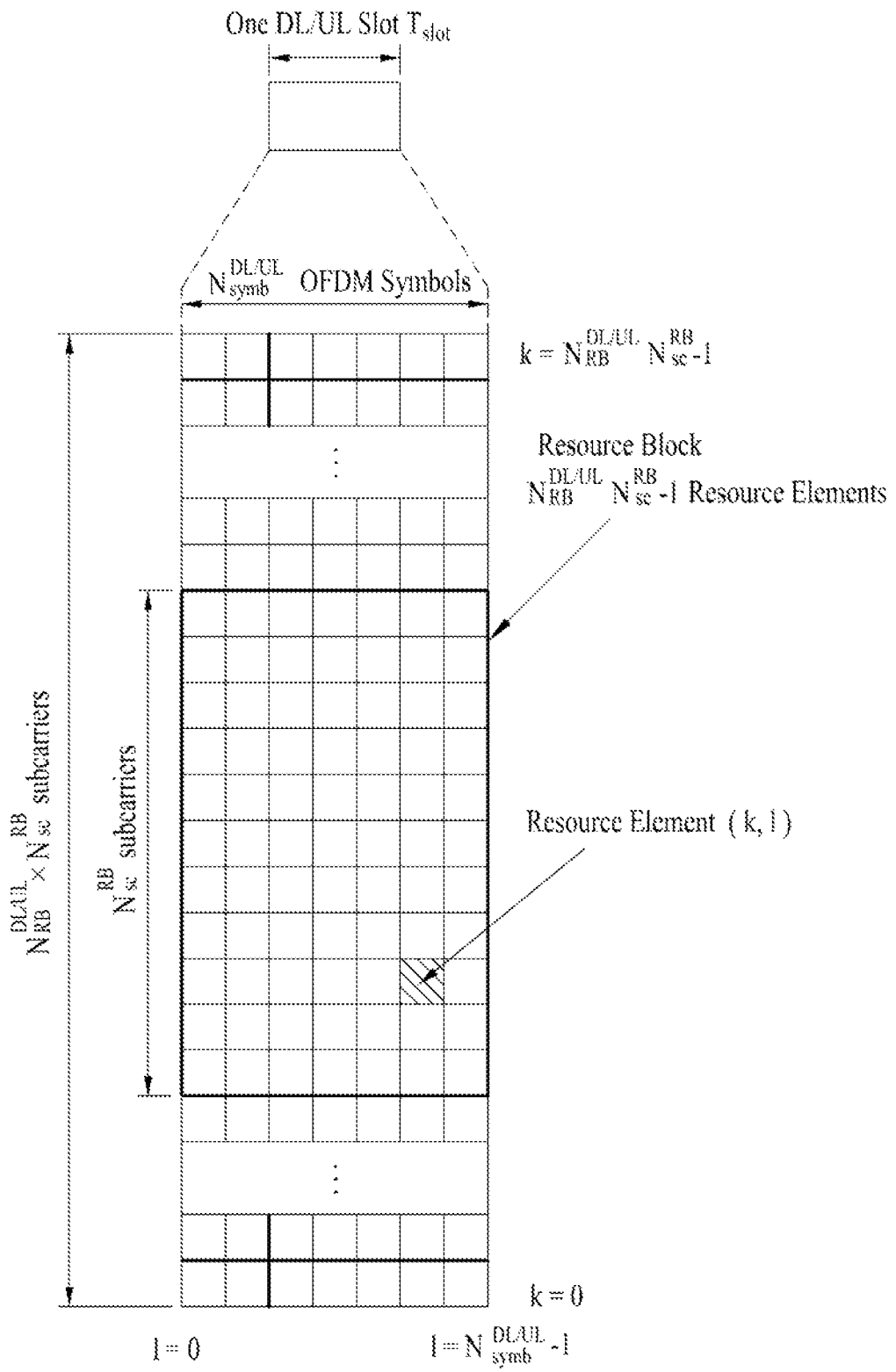
FIG. 2 illustrates an exemplary structure of a DL/UL slot in a wireless communication system.

FIG. 2 illustrates an exemplary structure of a downlink (DL)/uplink (UL) slot in a wireless communication system. Specifically, FIG. 2 illustrates the structure of a resource grid in a 3GPP LTE(-A) system. One resource grid is present per antenna port.

Referring to FIG. 2, a slot includes a plurality of OFDM symbols in the time domain and a plurality of resource blocks (RBs) in the frequency domain. An OFDM symbol may indicate one symbol duration. An RB includes a plurality of subcarriers in the frequency domain. An OFDM symbol may also be called an OFDM symbol or a single-carrier frequency division multiplex (SC-FDM) symbol etc. according to a multiple access scheme. The number of OFDM symbols per slot may vary depending on channel bandwidth and cyclic prefix (CP) length. For instance, one slot includes 7 OFDM symbols in case of a normal CP, whereas one slot includes 6 OFDM symbols in case of an extended CP. While a subframe is shown in FIG. 2 as having a slot with 7 OFDM symbols for convenience of description, embodiments of the present invention are also applicable to subframes with any other number of OFDM symbols. A resource including one OFDM symbol and one subcarrier is referred to as an RE or a tone.

Referring to FIG. 2, a signal transmitted in each slot may be expressed by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on DL transmission bandwidth and UL transmission bandwidth, respectively. Each OFDM symbol includes $N^{DL/UL}_{RB}N^{RB}_{sc}$ subcarriers in the frequency domain. The number of subcarriers per carrier is determined by Fast Fourier Transform (FFT) size. Subcarriers may be divided into data subcarriers for data transmission, reference signal subcarriers for reference signal transmission, and null subcarriers for a guard band and a Direct Current (DC) component. The null subcarriers for the DC component are remaining unused subcarriers and are mapped to a carrier frequency $f_0$ in an OFDM signal generation process. The carrier frequency is also referred to as a center frequency. $N^{DL}_{symb}$ represents the number of OFDM or SC-FDM symbols in the DL slot and $N^{UL}_{symb}$ represents the number of OFDM or SC-FDM symbols in the UL slot. $N^{RB}_{sc}$ represents the number of subcarriers in one RB.

Each RE in the resource grid may be uniquely defined by an index pair (k,l) in a slot. k is a frequency-domain index ranging from 0 to $N^{DL/UL}_{RB}N^{RB}_{sc}-1$ and l is a time-domain index ranging from 0 to $N^{DL/UL}_{symb}-1$.

Meanwhile, one RB is mapped to one physical resource block (PRB) and one virtual resource block (VRB). The PRB is defined as $N^{DL/UL}_{symb}$ (e.g. 7) consecutive OFDM symbols or SC-FDM symbols in the time domain and $N^{RB}_{sc}$ (e.g. 12) consecutive subcarriers in the frequency domain. Therefore, one PRB includes $N^{DL/UL}_{symb} \times N^{RB}_{sc}$ REs. In one subframe, two RBs, each located in one of two slots of the subframe, while occupying the same $N^{RB}_{sc}$ consecutive subcarriers are referred to as a PRB pair. The two RBs constituting the PRB pair have the same PRB number (or PRB index). The relationship between the PRB number $n_{PRB}$ and an RE (k,l) in a slot may be defined as follows.

$$n_{PRB} = \left\lfloor \frac{k}{N^{RB}_{sc}} \right\rfloor \quad \text{[Equation 1]}$$

Here, k denotes a subcarrier index and $N^{RB}_{sc}$ denotes the number of subcarriers included in one RB.

The VRB is a logical resource allocation unit introduced for resource allocation. The VRB is equal in size to the PRB. The VRB is classified into a VRB of a localized type and a VRB of a distributed type. The localized-type VRB is directly mapped to a PRB so that a VRB number (or VRB index) correspond directly to a PRB number. That is, $n_{PRB}=n_{VRB}$. The localized VRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs having the same PRB number in the first and second slots. In contrast, the distributed-type VRB is mapped to a PRB after interleaving. Accordingly, a distributed-type VRBs having the same VRB number may be mapped to PRBs having different PRB numbers in the first and second slots. Two PRBs having the same VRB number, located respectively in two slots of a subframe, are referred to as a VRB pair. The PRB pair and the VRB pair may be commonly referred to as an RB pair. An RB for a UE or a UE group is allocated based on a VRB. In principle, VRBs having the same VRB number are allocated to the same UE or UE groups.

Figure 3:
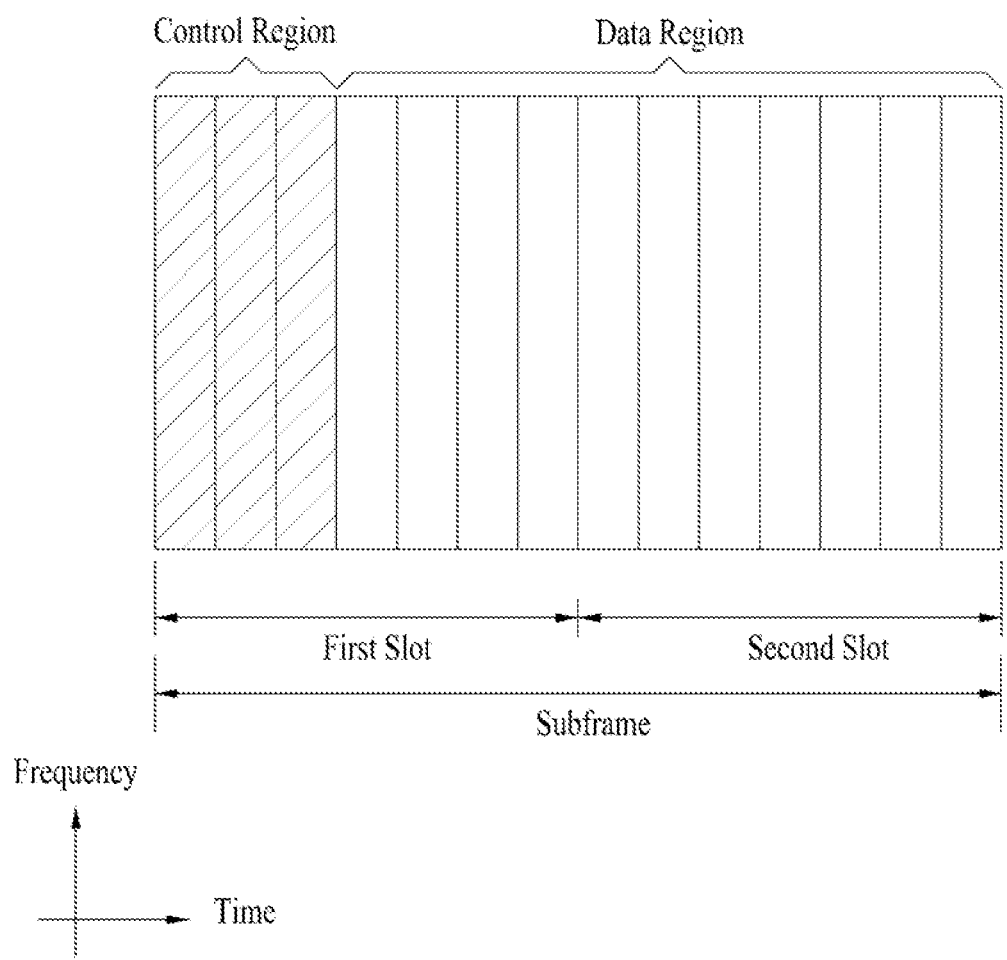
FIG. 3 illustrates an exemplary structure of a DL subframe used in a 3GPP LTE(-A) system.

FIG. 3 illustrates an exemplary structure of a DL subframe used in a 3GPP LTE(-A) system.

Referring to FIG. 3, a DL subframe may be divided into a control region and a data region. The control region includes one or more OFDM symbols starting from the first OFDM symbol. In the DL subframe of the 3GPP LTE(-A) system, the control region is configured as a region in which a PDCCH can be transmitted. Accordingly, the control region in the DL subframe is also referred to as a PDCCH region. The number of OFDM symbols used for the control region in the DL a subframe may be independently configured on a subframe basis and signaled through a PCFICH. A BS may transmit control information to a UE(s) in the control region. To transmit control information, a PDCCH, a PCFICH, a PHICH, etc. may be allocated to the control region.

The BS may transmit information related to resource assignment of a paging channel (PCH) and a DL shared channel (DL-SCH) that are transport channels, a UL scheduling grant, HARQ information, a downlink assignment index (DAI), a transmit power control (TPC) command, etc. to each UE or UE group on a PDCCH. Information related to resource assignment carried by the PDCCH may include RB assignment information, i.e. frequency resource information, used for UL/DL transmission of a corresponding UE. The BS may allocate frequency resources for the UE through the PDCCH.

The BS may transmit data to a UE or UE group in the data region. Data transmitted in the data region may be referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of downlink control information (DCI) transmitted on a PDCCH may vary according to a PDCCH format and the size of the DCI may vary according to coding rate. Information indicating to which UE or UE group PDSCH data is transmitted and information indicating how the UE or UE group should receive and decode PDSCH data are transmitted on the PDCCH. For example, it is assumed that a specific PDCCH is CRC-masked with a Radio Network Temporary Identity (RNTI) 'A' and information about data transmitted using a radio resource 'B' (e.g. frequency location) and using transport format information 'C' (e.g. transmission block size, modulation scheme, coding information, etc.) is transmitted through a specific DL subframe. Then, the UE in a corresponding cell monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. The UE may monitor the plurality of PDCCHs and thus detect a PDCCH thereof. Basically, since the UE is not aware of a position at which the PDCCH thereof is transmitted, the UE performs blind detection (or blind decoding) upon all PDCCHs with a corresponding DCI in every subframe until a PDCCH having an identifier (ID) thereof is received.

Figure 4:
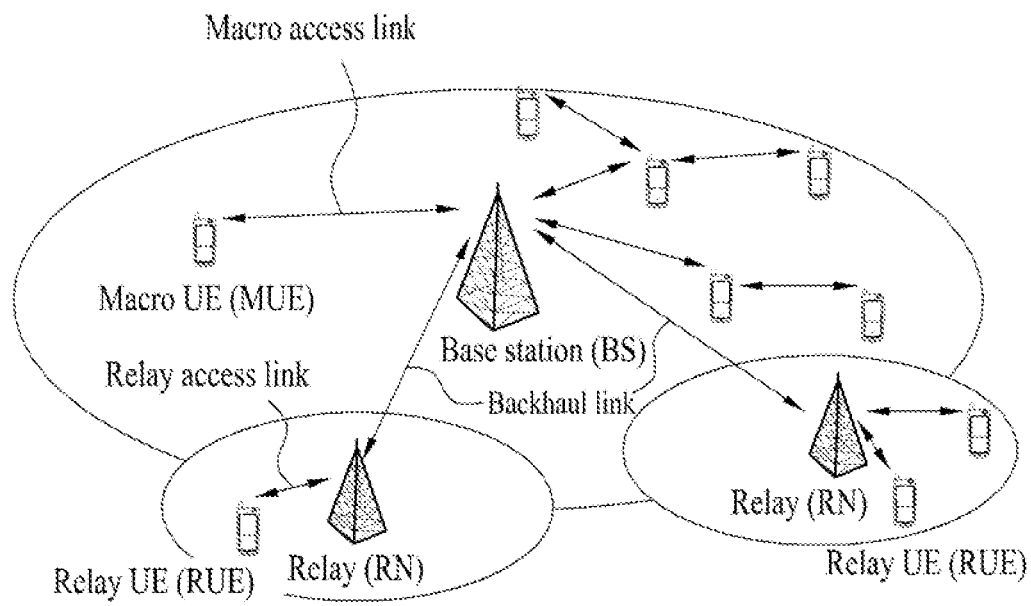
FIG. 4 illustrates a communication system including a relay (or relay node (RN)).

FIG. 4 illustrates a communication system including a relay (or relay node (RN)).

An RN extends the service area of a BS or is installed in a shadow area to provide a smooth service. Referring to FIG. 4, a wireless communication system includes a BS, RNs, and UEs. The UEs communicate with the BS or the RNs. For convenience, a UE communicating with a BS is referred to as a macro UE (MUE) and a UE communicating with an RN is referred to as a relay UE (RUE). A communication link between a BS and an MUE UE and a communication link between an RN and an RUE are referred to as a macro access link and an RN access link, respectively. A communication link between a BS and an RN is referred to as a backhaul link.

RNs may be classified into layer-1 (L1) RNs, layer-2 (L2) RNs, and layer-3 (L3) RNs according to functions thereof in multi-hop transmission. Characteristics of each RN will be briefly described hereinbelow. An L1 RN usually functions as a repeater. The L1 RN simply amplifies a signal received from a BS/UE and transmits the amplified signal to the UE/BS. Because the RN does not perform decoding, transmission delay of the signal is short. Despite this benefit, noise is also amplified because the L1 RN cannot separate signals from noise. To overcome this shortcoming, an advanced repeater or smart repeater having a UL power control or self-interference cancellation function may be used. Operation of an L2 RN may be described as decode-and-forward. The L2 RN can transmit user-plane traffic to L2. While it is advantageous that the L2 RN does not amplify noise, it is disadvantageous that decoding increases transmission delay. An L3 RN is depicted as self-backhauling and may transmit an Internet Protocol (IP) packet to L3. The L3 RN has a radio resource control (RRC) function and, thus, serves as a small-size BS.

The L1 and L2 RNs may be regarded as a portion of a donor cell covered by a BS. If an RN is a part of a donor cell, the RN does not have its own cell identity (ID) because it cannot control its cell and UEs of the cell. However, the RN may still have an ID thereof, i.e. an RN ID. In this case, some functions of radio resource management (RRM) may be controlled by the BS of the donor cell and parts of the RRM may be located in the RN. The L3 RN may control a cell thereof. Then the L3 RN may manage one or more cells and each of the cells managed by the RN may have a unique physical-layer cell ID. The L3 RN may have the same RRM mechanism as a BS. From the perspective of a UE, there is no difference between accessing a cell managed by the RN and accessing a cell managed by a normal BS.

In addition, RNs are classified as follows according to mobility.

Fixed RN: this type of RN is permanently fixed for use in a shadow area or for coverage extension. It may function as a simple repeater.

Nomadic RN: this type of RN is temporarily installed when users rapidly increase in number, or is movable within a building.

Mobile RN: this type of RN may be installed in public transport such as a bus or the subway. The mobility of the RN should be supported.

The following classifications can also be considered according to the link between an RN and a network.

In-band connection: a network-to-RN link shares the same frequency band with a network-to-UE link in a donor cell.

Out-band connection: a network-to-RN link and a network-to-UE link use different frequency bands in a donor cell.

Depending on whether a UE is aware of the existence of an RN, RNs may be classified as follows.

Transparent RN: a UE is not aware of whether or not communication with a network is performed via the RN.

Non-transparent RN: a UE is aware of whether or not communication with a network is performed via the RN.

Figure 5:
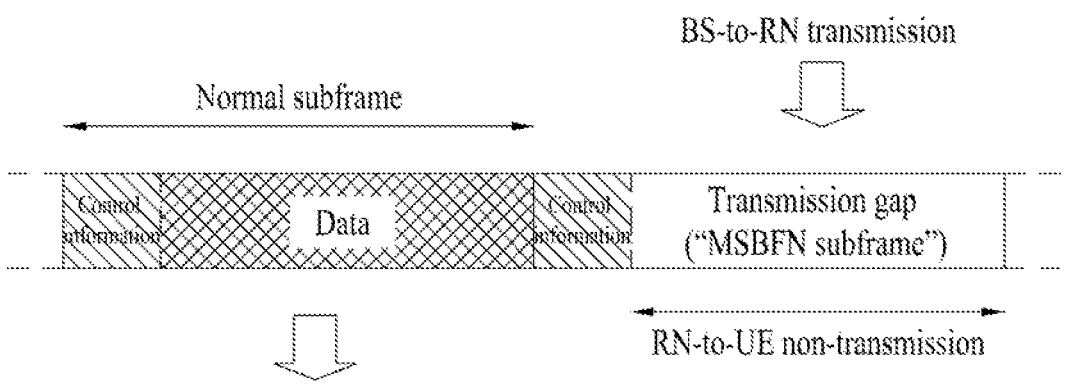
FIG. 5 illustrates exemplary backhaul transmission using a specific subframe.

FIG. 5 illustrates exemplary backhaul transmission using a specific subframe. Specifically, FIG. 5 illustrates RN-to-UE communication using a normal subframe and BS-to-RN communication using a multimedia broadcast over single frequency network (MBSFN) subframe.

In in-band relaying mode, a BS-to-RN link (i.e. a backhaul link) operates in the same frequency band as an RN-to-UE link (i.e. an RN access link). In the case in which an RN transmits a signal to a UE while receiving a signal from a BS or vice versa, the transmitter and receiver of the RN interfere with each other. Accordingly, simultaneous transmission and reception of the RN may be limited. To solve the interference problem, the RN may be configured not to perform communication with UEs in a time duration during which the RN receives data from the BS. The above time duration, i.e. a transmission gap, during which UEs do not expect any RN transmission, may be generated by configuring an MBSFN subframe. That is, the RN or BS configures a subframe as the MBSFN subframe and establishes a backhaul link in the MBSFN subframe (a fake MBSFN method). If a subframe is signaled as the MBSFN subframe, a UE detects a DL signal only in a control region of the subframe and thus the RN may establish the backhaul link using a data region of the subframe. An RN may receive a signal from a BS in a specific subframe (e.g. MBSFN subframe) and transmit data received from the BS to an RUE in another subframe. In this process, the RN performs transmission/reception switching on the same frequency and, thus, the case in which a specific symbol cannot be used may occur. In consideration of such a situation, according to definition in standard (TS 36.216) for a 3GPP LTE(-A) RN, a UE may be informed of a start symbol and end symbol constituting a backhaul link in each slot in a subframe through higher layer signaling or the UE may configure the start symbol and end symbol according to a frame synchronization situation. The following Table 1 and Table 2 show the start symbol and end symbol for the backhaul link. Specifically, Table 1 shows OFDM symbols for BS-to-RN transmission in the first slot in a subframe having a subcarrier spacing of $\Delta f=15$ kHz and a normal CP and Table 2 shows OFDM symbols for BS-to-RN transmission in the second slot in a subframe having a subcarrier spacing of $\Delta f=15$ kHz and a normal CP.

TABLE 1

| Configuration | DL-Start Symbol | End symbol index |
|---|---|---|
| 0 | 1 | 6 |
| 1 | 2 | 6 |
| 2 | 3 | 6 |

TABLE 2

| Configuration | Start symbol index | End symbol index |
|---|---|---|
| 0 | 0 | 6 |
| 1 | 0 | 5 |

Meanwhile, for demodulation of a signal transmitted between a BS and an RN/UE, a reference signal (RS) to be compared with a data signal is needed. The RS indicates a signal of a predefined special waveform, known to the BS and RN/UE, transmitted from the BS to the UE/RN or from the UE/RN to the BS and is referred to as a pilot signal. RSs may broadly be classified into dedicated RSs (DRSs) and common RSs (CRSs). RSs may also be divided into RSs for demodulation and RSs for channel measurement. A CRS and a DRS are also referred to as a cell-specific RS and a demodulation RS (DMRS), respectively. The DMRS may also be referred to as a UE-specific RS. The DMRS and CRS may be transmitted together or one of the DMRS or the CRS may be transmitted. Nonetheless, in the case in which only the DMRS is transmitted without the CRS, an RS for channel measurement should be separately provided because the DMRS transmitted by applying the same precoder as data can be used only for demodulation. For example, in 3FPP LTE(-A), a CSI-RS, which is an additional RS for measurement, is transmitted to the UE so that the UE may measure CSI. The CSI-RS is transmitted in every prescribed transmission period comprised of multiple subframes, unlike a CRS transmitted in every subframe, based on the fact that channel state does not undergo a substantial variation over time.

Figure 6:
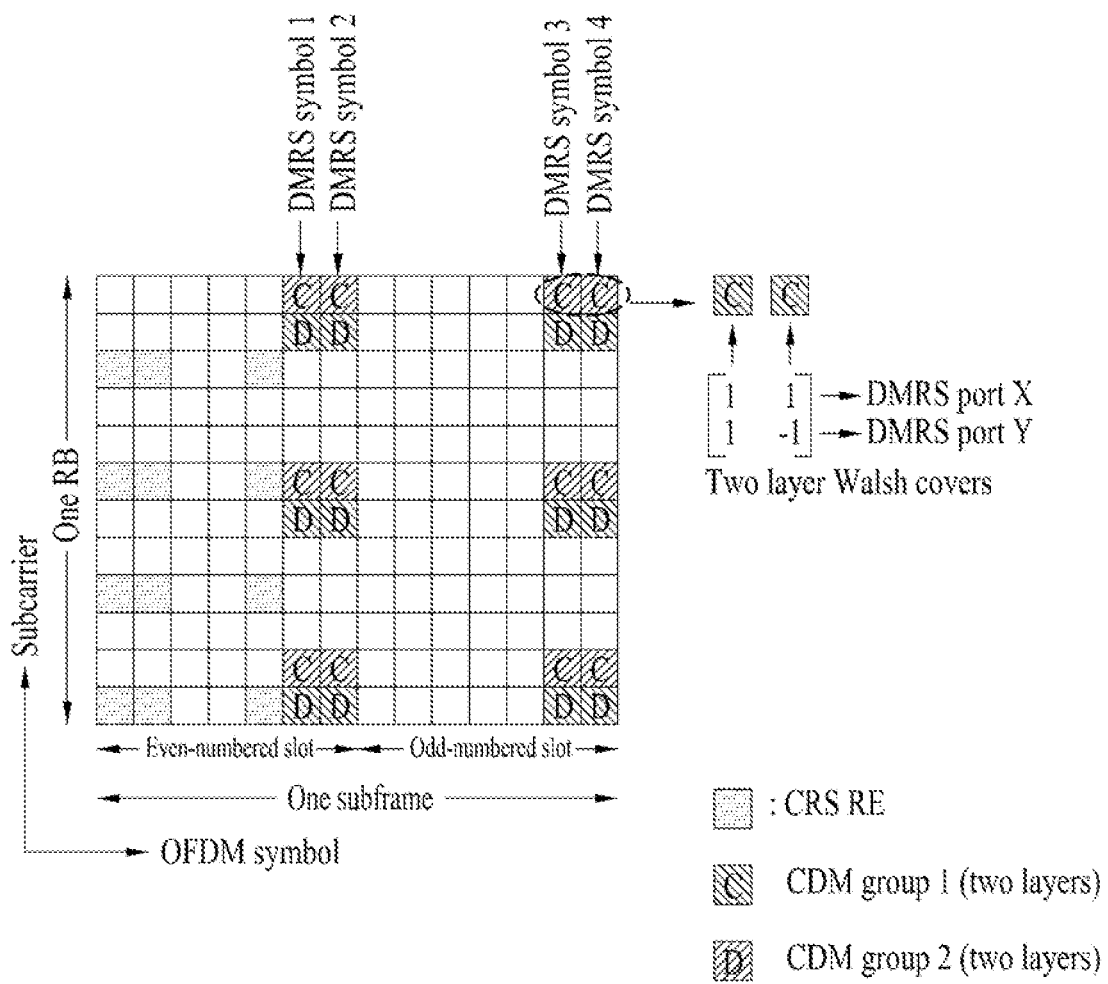
FIGS. 6 and 7 illustrate time-frequency resources for CRSs and DMRSs in an RB pair of a normal subframe having a normal CP.
Figure 7:
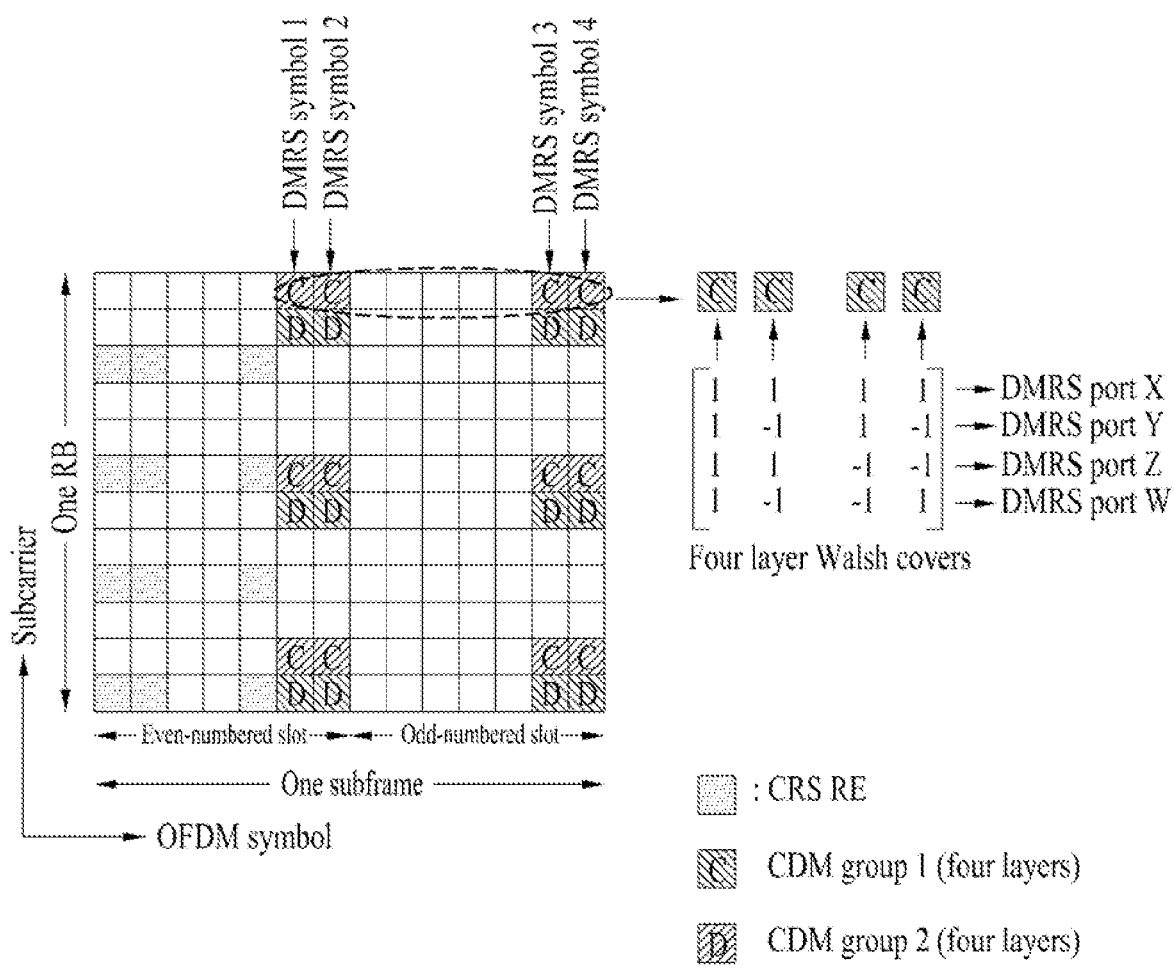

FIGS. 6 and 7 illustrate time-frequency resources for CRSs and DMRSs in an RB pair of a normal subframe having a normal CP. Specifically, FIG. 6 illustrates a method for multiplexing a maximum of 4 DMRSs with two CDM groups and FIG. 7 illustrates a method for multiplexing a maximum of 8 DMRSs with two CDM groups.

Referring to FIGS. 6 and 7, DMRSs are defined in a PRB pair in a 3GPP LTE(-A) system. Hereinbelow, among REs of one PRB pair, a set of REs in which distinguishable DMRSs extended by orthogonal cover codes are transmitted is referred to as a code division multiplexing (CDM) group. The orthogonal cover code may be, for example, a Walsh-Hadmard code. The orthogonal cover code may also be called an orthogonal sequence. Referring to FIGS. 6 and 7, REs denoted by 'C's belong to one CDM group (hereinafter, CDM group 1) and REs denoted by 'D' belong to another CDM group (hereinafter, a CDM group 2).

In a 3GPP LTE(-A) system, a plurality of layers may be multiplexed in one subframe and then is transmitted to a receiving device. In the present invention, a layer transmitted by a transmitting device indicates an information input path to a precoder. The layer may be referred to as a transmission layer, a stream, a transmission stream, or a data stream. Transmission data is mapped to one or more layers. Therefore, data is transmitted from the transmitting device to the receiving device by one or more layers. In case of multi-layer transmission, the transmitting device transmits DMRS per layer, and the number of DMRSs increases in proportion to the number of transmission layers.

Referring to FIG. 6, a DMRS of one layer is spread by a length-2 orthogonal sequence and the spread DMRS is transmitted on two DMRS REs located on two consecutive DMRS symbols in one CDM group. That is, a result of spreading each DMRS in an OFDM symbol direction is mapped on two consecutive DMRS REs. According to FIG. 6, a maximum of two DMRSs may be multiplexed using two length-2 orthogonal sequences on the two consecutive DMRS REs. The two orthogonal sequences correspond to sequences of a row direction in a 2*2 matrix of FIG. 6. If four layers are transmitted, four DMRSs for the four layers are multiplexed to CDM group 1 and CDM group 2, two DMRSs per CDM group. The receiving device receives a DMRS(s) corresponding to a layer(s) allocated thereto in CDM group 1 and/or CDM group 2. One antenna port may transmit one layer and one DMRS. Hereinbelow, a virtual antenna port transmitting a DMRS is referred to as a DMRS port. In the case where the transmitting device should transmit four layers, a maximum of two antenna ports may transmit two DMRSs using one CDM group. For example, DMRS port X and DMRS port Y may transmit two DMRSs spread by different orthogonal sequences, respectively, using the same CDM group. Using an orthogonal sequence used to multiplex a corresponding DMRS on two consecutive DMRS REs in an OFDM symbol direction, the receiving device may detect the DMRS from a signal received on the two consecutive DMRS REs.

Referring to FIG. 7, a DMRS of one layer is spread by a length-4 orthogonal sequence and the spread DMRS is transmitted on four DMRS REs located on four consecutive DMRS symbols in one CDM group. That is, a result of spreading each DMRS is mapped on four consecutive DMRS REs in an OFDM symbol direction. According to FIG. 7, a maximum of four DMRSs may be multiplexed using four length-4 orthogonal sequences on the four consecutive DMRS REs. The four orthogonal sequences correspond to sequences of a row direction in a 4*4 matrix of FIG. 7. If eight layers are transmitted, eight DMRSs for the eight layers are multiplexed to CDM group 1 and CDM group 2, four DMRSs per CDM group. The receiving device receives a DMRS(s) corresponding to a layer(s) allocated thereto in CDM group 1 and/or CDM group 2. One antenna port may transmit one layer and one DMRS. In the case where the transmitting device should transmit eight layers, a maximum of four antenna ports may transmit four DMRSs using one CDM group. For example, DMRS port X, DMRS port Y, DMRS port Z, and DMRS port W may transmit four DMRS spread by different orthogonal sequences, respectively, using the same CDM group. Using an orthogonal sequence used to multiplex a corresponding DMRS on four consecutive DMRS REs in an OFDM symbol direction, the receiving device may detect the DMRS from a signal received on the four consecutive DMRS REs.

The current 3GPP LTE(-A) standard, 3GPP TS 36.211, specifies in relation to downlink DMRSs, i.e. UE-specific RSs that the UE-specific RSs are present and are a valid reference for PDSCH demodulation, only when PDSCH transmission is associated with a corresponding antenna port. 3GPP TS 211 also specifies that UE-specific RSs are transmitted only on RBs upon which a corresponding PDSCH is mapped. Therefore, according to the current 3GPP LTE(-A) standard, the DMRS may be transmitted only in a PRB to which the PDSCH is mapped and is valid only in the PRB to which the PDSCH is mapped.

Meanwhile, 3GPP TS 36.216, which is a 3GPP LTE(-A) standard regarding an RN operation, standardization of which is underway, specifies that a PDSCH for transmission from a BS to an RN (hereinafter, BS-to-RN transmission) should be processed and should be mapped to REs as defined in 3GPF TS 36.211. Notably, 3GPP TS 36.216 specifies that the PDSCH should be mapped only in REs in OFDM symbols configured according to Table 1 and Table 2 and the PDSCH shall not be mapped to any RE in the first slot when the first slot of an RB pair is used for R-PDCCH transmission. That is, although PDSCH processing and mapping in BS-to-RN transmission basically conforms to a BS-to-UE transmission method, if an R-PDCCH is transmitted in the first slot of the RB pair, the PDSCH cannot be mapped in the first slot in which the R-PDCCH is detected, irrespective of the available amount of resources.

According to above-described 3GPP TS 36.211 and 3GPP TS 36.216, while a PDSCH can be mapped to a PRB in one slot in an RN, a DMRS is defined in a PRB pair. Accordingly, if a PDSCH for an RN is transmitted in one slot only, DMRS transmission is problematic. Namely, if an R-PDCCH is mapped in the first slot of an RB pair, the PDSCH of the RN can be transmitted only in the second slot of the RB pair and presence/absence of the DMRS in the first slot is unclear.

Meanwhile, distributed-type VRBs are mapped, in principle, to different PRBs in first and second slots of one subframe. In this case, since a PDSCH will be allocated only to one slot of a PRB pair, whether or not a DMRS is present is unclear. Meanwhile, a legacy 3GPP LTE standard specifies that PDSCH transmission indicated by DCI of format 1 series should be performed based on a CRS. However, a communication technology using an MBSFN subframe has been introduced and this means that the CRS is not transmitted in the MBSFN subframe. Accordingly, it is possible to use the DMRS even in the DCI format 1 series and a VRB may be mapped to a PRB by a distributed mapping scheme in the MBSFN subframe. Therefore, in a situation in which the PDSCH is present only in one slot of a PRB pair, necessity for definition as to how the DMRS should be processed is increasing.

To solve the aforementioned problem, if the PDSCH is present only in one slot of a PRB pair, a method in which the DMRS is not used may be considered. However, if RN transmission uses an MBSFN subframe, since CRS transmission is not permitted in a data region of the MBSFN subframe, CRS based data demodulation performance is lower than DMRS based data demodulation performance even if there is a CRS transmitted in a control region of the MBSFN subframe.

As another method for solving the above problem, when the PDSCH is present only in one slot of a PRB pair, the DMRS may be transmitted only in a slot in which the PDSCH is present. However, if the DMRS is transmitted only in one slot of the PRB pair, demodulation performance in a receiving device is deteriorated. For example, referring to FIG. 6, if DMRSs are transmitted in two consecutive DMRS REs in an OFDM symbol direction in the first slot and in two consecutive DMRS REs in an OFDM symbol direction in the second slot using length-2 orthogonal sequences, a signal received in the two DMRS REs of one slot of the first and second slots includes all information indicating the DMRSs. Accordingly, up to four-layer transmission, the receiving device may obtain valid DMRSs by despreading the signal in the two consecutive DMRS REs using a corresponding orthogonal sequence even if the DMRSs are received in one of the two slots of the PRB pair. If DMRSs are transmitted in each of both slots of the PRB pair, the receiving device can raise DMRS performance by interpolating DMRSs received in each of both slots of the PRB pair. However, if the DMRSs are received in one slot only, interpolation with DMRSs in another slot cannot be performed. Accordingly, if the DMRSs are transmitted only in one slot of the PRB pair, demodulation performance is inevitably deteriorated. Referring to FIG. 7, if the transmitting device simultaneously transmits more than four layers, DMRSs are spread by length-4 orthogonal sequences and transmitted on four DMRS REs over two slots of a PRB pair. That is, the receiving device may detect the DMRSs only when receiving all signals from four consecutive DMRS REs in an OFDM symbol direction in the two slots of the PRB pair. Accordingly, if the DMRSs are transmitted only in one slot of the PRB pair, it is difficult to detect valid DMRSs in transmission exceeding rank-4. Consequently, if the DMRSs are transmitted only in one slot of the PRB pair, the number of layers which can be simultaneously transmitted by the transmitting device is restricted to 4.

Accordingly, the present invention proposes that, in the case in which a DMRS is allocated to one slot of a PRB pair, the DMRS be allocated even to the other slot of the PRB pair. In other words, according to the present invention, if a DMRS is allocated to one slot of a PRB pair by allocation of data, the DMRS for demodulating the data are allocated even to the other slot unconditionally (i.e. irrespective of whether the data is allocated to the other slot of the PRB). If a transmitting device transmits a PDSCH only in one slot of a PRB pair by the restriction regulation, the transmitting device transmits both the PDSCH and a DMRS for demodulating the PDSCH in one slot and transmits only the DMRS in the other slot. According to the present invention, even if the PDSCH is configured only in one slot of a PRB pair, since the DMRS for the receiving device is transmitted over two slots, the receiving device can demodulate the PDSCH without the need of an additional processing operation for the case in which the DMRS is present only in one slot or a detection operation of a CRS for the case in which no DMRS is present. Hereinafter, embodiments to which the present invention is applicable will be described.

<Localized VRB-to-PRB Mapping>

1. The present invention may be applied to the case in which all available REs of a PRB pair are allocated to the same receiving device. That is, the present invention may be applied to configuration of localized VRB-to-PRB mapping. According to localized VRB-to-PRB mapping, if one slot of the PRB pair is applied to a specific receiving device or receiving device group, the other slot is not allocated in principle to receiving devices other than the specific receiving device or receiving device group. If the present invention is applied to the localized VRB-to-PRB mapping scheme, even though a PDSCH is configured only in one slot of a PRB pair, a DMRS for a corresponding receiving device is transmitted over two slots of the PRB pair.

2. The present invention may be applied even to the case in which an R-PDCCH is transmitted in the first slot of a PRB pair configured for RN transmission. According to the current 3GPP TS 36.216 standard, if the R-PDCCH is transmitted in the first slot of the PRB pair included in a frequency resource allocated to an RN for BS-to-RN transmission, a PDSCH cannot be transmitted in the first slot and can be transmitted only in the second slot. However, if the present invention is applied, even though the PDSCH is transmitted only in the second slot of the PRB pair, a DMRS(s) corresponding to the PDSCH is transmitted in both the first slot and second slot of the PRB pair.

According to the above-described embodiments, a receiving device may detect or demodulate the PDSCH using the DMRS without the need for additional processing for the case in which the DMRSs are present only in the one slot, for example, a channel estimation operation. In addition, according to the above-described embodiments, since the DMRS is transmitted over both slots, DMRS performance, which is the same performance obtained when the PDSCH is allocated to both slots of the PRB pair, may be acquired. For example, even when the PDSCH is transmitted only in one slot of the PRB pair, the receiving device uses the DMRS in each slot for channel estimation to perform more accurate channel estimation and (in case of one- to four-layer transmission) the transmitting device may simultaneously transmit up to 8 layers using length-4 orthogonal sequences and two CDM groups each including four consecutive DMRS REs in the direction of symbols.

If a VRB to which a DMRS-based PDSCH is allocated is mapped to a PRB by a distributed mapping scheme, a PDSCH for a specific receiving device is mapped to one slot of a PRB pair and a PDSCH for another receiving device is mapped to the other slot, due to attributes of the distributed mapping scheme. Therefore, a situation in which a DMRS cannot be simply mapped to both slots of the PRB pair occurs. In contrast, if the present invention is applied to localized VRB-to-PRB mapping or RN transmission, the DMRS may be easily mapped to both slots of the PRB pair without additional processing. In consideration of this fact, the present invention may be limitedly applied to localized VRB-to-PRB mapping and/or the case in which an R-PDCCH is configured in the first slot of a PRB pair for RN transmission. If application of the present invention is restricted to localized VRB-to-PRB mapping, such restrictions may be interpreted as not using a distributed mapping scheme for DMRS-based PDSCH transmission or mapping a VRB of a PDSCH to a PRB according to a localized scheme irrespective of a mapping scheme (localized mapping or distributed mapping) signaled through a DCI format.

<Distributed VRB-to-PRB Mapping>

Unlike the localized VRB-to-PRB mapping scheme, if the present invention is applied to distributed VRB-to-PRB, DMRSs cannot be simply mapped to two slots of a PRB due to attributes of distributed VRB-to-PRB mapping in which a PDSCH for a specific receiving device is mapped to one slot of a PRB pair and a PDSCH for another receiving device is mapped to the other slot. However, distributed VRB-to-PRB mapping, i.e. distributed VRBs, to which the present invention is applied may obtain advantages of efficient use of time-frequency resources and improvement in frequency diversity gain. Hereinafter, embodiments of applying the present invention to distributed VRB-to-PRB mapping will be described.

1. An embodiment of the present invention proposes to use scheduling restrictions in which two slots in the same PRB pair are allocated to the same receiving device even in a distributed VRB-to-PRB situation. The present embodiment may be implemented by allocating two VRB numbers constituting the single PRB pair to the same receiving device. Especially, in most frequency regions, a VRB of 3GPP LTE uses a depth-4 block interleaver. Therefore, if a transmitting device performs distributed allocation of a 4-RB unit, i.e. if VRBs are mapped to PRBs so that start and end points of the VRB numbers allocated to a PDSCH may be multiples of 4, two slots of the allocated PRB pair may be allocated to the PDSCH of a specific receiving device.

Alternatively, if the transmitting device allocates data of a specific receiving device to one slot of a PRB pair, data of another receiving device may not be allocated to the other slot of the PRB pair. Especially, the transmitting device is preferably configured not to allocate the other slot of the PRB pair to a receiving device configured to demodulate a CRS-based PDSCH. Since the receiving device for performing CRS-cased demodulation uses a CRS for demodulation, the receiving device does not recognize the presence of the DMRS and recognizes a DMRS RE as a data RE. Therefore, the receiving device cannot properly demodulate corresponding data.

According to the present embodiment, effects which can be obtained when the present invention is applied to localized VRB-to-PRB mapping, may be acquired with scheduling restrictions.

2. According to the above-described embodiments of the present invention including the embodiments of localized VRB-to-PRB mapping, two slots of a PRB pair are used by the same receiving device or the same receiving device group. However, the present invention may not be restricted only to the case in which the two slots of the PRB pair are allocated to the same receiving device or same receiving device group.

Figure 8:
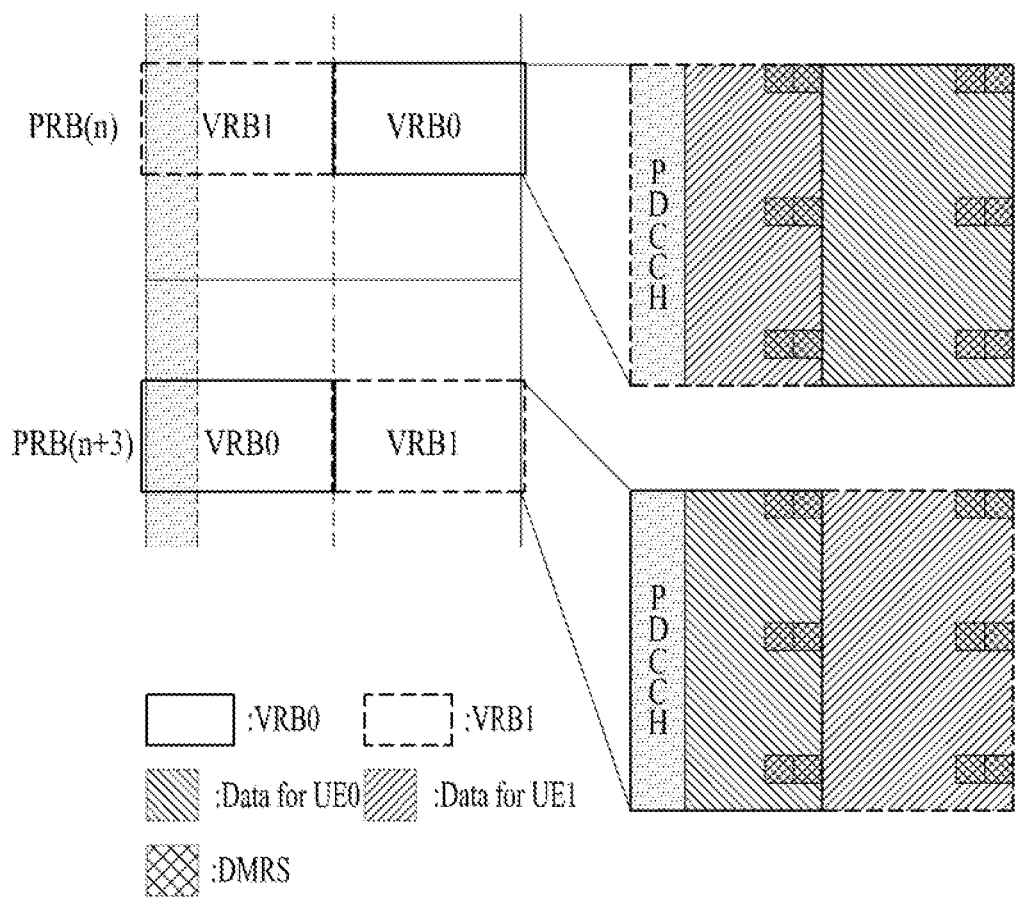
FIG. 8 is a view explaining an embodiment of the present invention applied to distributed VRB-to-PRB mapping.

FIG. 8 is a view explaining an embodiment of the present invention applied to distributed VRB-to-PRB mapping.

If the present invention is applied to a distributed VRB, two slots of a PRB pair are used by different receiving devices. In this case, a transmitting device according to the embodiment of the present invention performs DMRS based data transmission for a specific receiving device in one slot of the PRB pair and performs DMRS-based data transmission for another receiving device other than the specific receiving device in the other slot. The transmitting device transmits DMRSs for different receiving devices using different scrambling IDs or different antenna ports over the two slots of the PRB pair to the different receiving devices. For example, referring to FIG. 8, the transmitting device may map VRB0, to which data for UE0 is allocated, to one slot of a PRB pair PRB(n) (and/or one slot of a PRB pair PRB(n+3)) and map VRB1, to which data for UE1 is allocated, to another slot of a PRB pair PRB(n) (and/or another slot of a PRB pair PRB(n+3)). The transmitting device may transmit the data for UE0 in a PRB to which VRB0 is mapped and transmit the data for UE1 in a PRB to which VRB1 is mapped. The transmitting device scrambles a DMRS for UE0 and a DMRS for UE1 using different scrambling IDs (e.g. the DMRS of UE0 is scrambled using SCID=0 and the DMRS of UE1 is scrambled using SCID=1) and transmits the scrambled DMRSs over two slots of the PRB pair using the same DMRS resources. The scrambling IDs may be transmitted to corresponding UEs using DCI. As another example, the transmitting device transmits the DMRS for UE0 and the DMRS for UE1 over two slots of the PRB pair through different antenna ports. For example, the DMRS for UE0 may be transmitted on DMRS REs of CDM group 1 through antenna port 7 and the DMRS for UE1 may be transmitted on DMRS REs of CDM group 1 through antenna port 8. In this case, the DMRS for UE0 and DMRS for UE1 may be different or the same. For reference, according to the current 3GPP LTE(-A) standard, a CDM group, which can be used by each antenna port, is fixed. For example, DMRSs transmitted by antenna ports 7, 8, 11, and 13 are transmitted on CDM group 1 and DMRSs transmitted by antenna ports 9, 10, 12, and 14 are transmitted on CDM group 2.

The receiving device may receive a scrambling ID applied to a DMRS for the receiving device and/or information indicating an antenna port transmitting the DMRS from the transmitting device. The receiving device may determine an antenna port(s) through which a layer(s) carrying data thereof is transmitted to be an antenna port(s) through which a DMRS(s) thereof is transmitted. Using a scrambling ID and/or an antenna port allocated to the receiving device, the receiving device may implicitly recognize that a signal received on DMRS REs includes a DMRS for another receiving device. The receiving device may receive data therefor in one slot of a PRB pair allocated thereto and decode or demodulate the data using DMRSs received over both slots of the PRB pair. Since a DMRS for the receiving device has been multiplexed with a DMRS for another receiving device on the same DMRS resource, the receiving device may detect the DMRS thereof using the scrambling ID thereof and/or an antenna port through which the DMRS thereof has been transmitted.

Meanwhile, it is possible to transmit DMRSs for different receiving devices on different DMRS resources. For example, a DMRS for UE0 may be transmitted in CDM group 1 and a DMRS for UE1 may be transmitted in CDM group 2.

According to this embodiment, although additional processing such as application of different scrambling IDs and/or use of different antenna ports is needed to distinguish between DMRSs for different receiving devices, the present embodiment can obtain effects which are the same as the above-described effects in the embodiments of the present invention related to localized VRB-to-PRB since each receiving device receives DMRSs over two slots of the PRB pair.

<Extension to General PR Pair>

According to the aforementioned embodiments of the present invention, if a DMRS is transmitted in one slot of a PRB pair, the DMRS is transmitted even in the other slot irrespective of whether a PDSCH is transmitted in the other slot. However, the present invention is not restricted to the PRB pair and may be applied to a VRB pair in addition to the PRB pair. That is, application of the present invention may be extended to a general RB pair.

Figure 9:
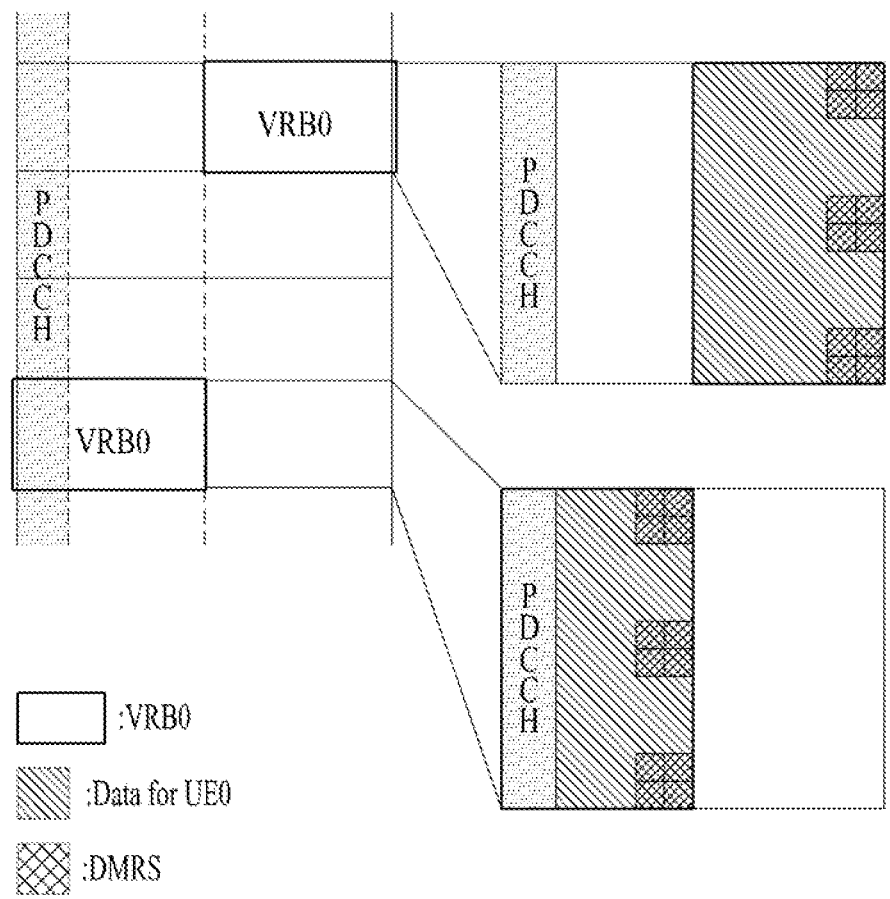
FIG. 9 is a view explaining another embodiment of the present invention applied to a distributed VRB pair.

FIG. 9 is a view explaining another embodiment of the present invention applied to a distributed VRB pair. The present invention may be extended to an RB pair in addition to the PRB pair.

According to the present invention, an embodiment in which, if a DMRS is transmitted in one slot of a specific PRB pair, the DMRS is transmitted even in the other slot of the same VRB pair is proposed. Referring to FIG. 9, according to the present embodiment, even when a DMRS is present in a specific slot of a specific PRB pair, if the other slot of the specific PRB pair has a different VRB number, the DMRS is not present in the other slot. Instead, the DMRS is located in a slot having the same VRB number as a VRB number of the specific slot of the specific PRB pair among slots of other PRB pairs. In other words, the DMRS is allocated to a VRB to which a PDSCH is mapped.

According to the present embodiment, since the DMRS is transmitted using different PRBs in two slots of one subframe, channel estimation for the different PRBs may be needed. However, since each receiving device receives the DMRS in two slots of the RB pair, effects which are the same effect described in the embodiments of the present invention related to localized VRB-to-PRB can be obtained.

Figure 10:
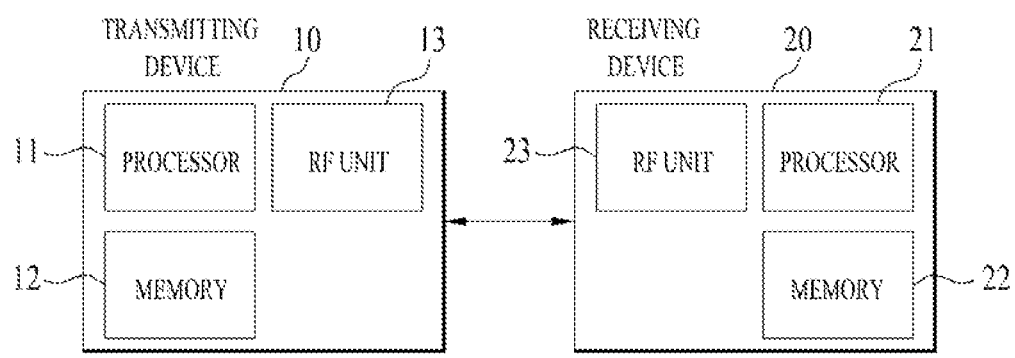
FIG. 10 is a block diagram illustrating elements of a transmitting device 10 and a receiving device 20 implementing the present invention.

FIG. 10 is a block diagram illustrating elements of a transmitting device 10 and a receiving device 20 implementing the present invention.

In the above-described embodiments of the present invention, the transmitting device 10 may be a BS and the receiving device 20 may be a UE or an RN.

The transmitting device 10 and the receiving device 20 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 to perform at least one of the above-described embodiments of the present invention.

The memories 12 and 22 may store programs for processing and controlling the processors 11 and 21 and may temporarily store input/output information. The memories 12 and 22 may serve as buffers.

The processors 11 and 21 typically control the overall operation of various modules in the transmitting device 10 or the receiving device 20. Especially, the processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled by the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling, and modulation processes. The coded data stream is also referred to as a codeword and is equivalent to a transport block, which is a data block provided by a MAC layer. One transport block (TB) is coded into one codeword and each codeword is transmitted to the receiving device 20 in the form of one or more layers. The processor 11 precodes a layer to be transmitted to the receiving device 20 and maps the precoded layer to time-frequency resources. The processor 11 allocates data mapped to a localized-type VRB or distributed-type VRB to a PRB. The processor 11 of the present invention is configured to map data to be transmitted to the receiving device 20 to at least one slot of an RB pair and map a DMRS related to a layer carrying the data to DMRS resources on two slots of the RB pair according to any one of the above-described embodiments of the present invention. The data and DMRS generated and/or processed by the processor 11 are frequency-upconverted by the RF unit 13 to be transmitted to the receiving device on a corresponding time-frequency resource through a corresponding antenna according to an embodiment of the present invention. For frequency upconversion, the RF unit 13 may include an oscillator. The RF unit 13 may include $N_t$ (where $N_t$ is a positive integer) transmit antennas. The RF unit 13 may transmit control information necessary for the receiving device 20 to receive/detect the data and DMRS to the receiving device 20 under control of the processor 11. The control information may include information about the RB pair to which the DMRS is allocated and information about a scrambling ID, an orthogonal sequence, and an antenna port.

A signal processing process of the receiving device 20 is the reverse of the signal processing process of the transmitting device 10. The RF unit 23 of the receiving device 20 receives a radio signal transmitted by the transmitting device 10. The radio signal carries data, an RS, or control information transmitted by the transmitting device 10. The RF unit 23 of the present invention receives data and a DMRS transmitted according to the above-described embodiment of the present invention from the transmitting device 10 under control of the processor 21. The RF unit 23 may include Nr receive antennas and frequency-downconverts each signal received through the receive antennas into a baseband signal. The processor 21 decodes and demodulates radio signals received through the receive antennas and restores data that the transmitting device 10 originally desired to transmit. The processor 21 controls the RF unit 23 based on control information received from the transmitting device 10 to receive data in at least one of two slots of an RB pair and receive a DMRS in each of the two slots of the RB pair, according to the above-described embodiment of the present invention. The processor 21 may detect the DMRS for the data from signals received over the two slots of the RB pair. The processor 21 may detect the DMRS for the receiving device 20 from a signal received by the RF unit on time-frequency resources for the DMRS, for example, DMRS REs, using at least one of an orthogonal sequence used to multiplex a set of prescribed time-frequency resources, a scrambling ID applied to the DMRS, and an antenna port used for transmission of the DMRS. The processor 21 demodulates data received from the transmitting device 10 using the DMRS.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. An RS transmitted through a corresponding antenna defines an antenna viewed in terms of the receiving device 20 and enables the receiving device 20 to perform channel estimation for the antenna, irrespective of whether a channel is a single radio channel transmitted from one physical channel or a composite channel transmitted from a plurality of physical antennas including the antenna. That is, an antenna is defined such that a channel for transmitting a symbol on the antenna can be derived from the channel through which another symbol on the same antenna is transmitted. An RF unit supporting a Multiple Input Multiple Output (MIMO) function of transmitting and receiving data using a plurality of antennas may be connected to two or more antennas.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to BSs, UEs, or other equipment in a wireless communication system.

The invention claimed is:

1. A method for receiving a downlink signal at a receiving device in a wireless communication system, the method comprising:
    receiving a Relay-Physical Downlink Control Channel (R-PDCCH) allocated in a first resource block and a Physical Downlink Shared Channel (PDSCH) in a second resource block from a transmitting device, wherein demodulation reference signals for demodulating the PDSCH are transmitted over the first resource block and the second resource block; and
    demodulating the PDSCH using the demodulation reference signals on the first resource block and the second resource block,
    wherein the first and second resource blocks include a prescribed number of same consecutive subcarriers,
    wherein the first resource block and the second resource block are interleaved with depth-4, and
    wherein a virtual resource block index of the first resource block plus 4 is equal to a virtual resource block index of the second resource block.

2. The method according to claim 1, wherein the demodulation reference signals are received using a scrambling ID or an antenna port allocated to the receiving device.

3. A method for transmitting a downlink signal at a transmitting device in a wireless communication system, the method comprising:
    allocating demodulation reference signals for demodulating a Physical Downlink Shared Channel (PDSCH) over a first resource block and a second resource block;
    interleaving the first resource block and the second resource block with depth-4; and
    transmitting a Relay-Physical Downlink Control Channel (R-PDCCH) allocated in the first resource block and the PDSCH in the second resource block to a receiving device,
    wherein the first and second resource blocks include a prescribed number of same consecutive subcarriers, and
    wherein a virtual resource block index of the first resource block plus 4 is equal to a virtual resource block index of the second resource block.

4. The method according to claim 3, wherein the demodulation reference signals are transmitted using a scrambling ID or an antenna port allocated to the receiving device.

5. A receiving device for receiving a downlink signal in a wireless communication system, the receiving device comprising:
    a radio frequency (RF) unit configured to receive signals;
    a processor configured to:
    control the RF unit,
    receive a Relay-Physical Downlink Control Channel (R-PDCCH) allocated in a first resource block and a Physical Downlink Shared Channel (PDSCH) in a second resource block from a transmitting device, wherein demodulation reference signals for demodulating the PDSCH are transmitted over the first resource block and the second resource block, and
    demodulate the PDSCH using the demodulation reference signals on the first resource block and the second resource block,
    wherein the first and second resource blocks include a prescribed number of same consecutive subcarriers,
    wherein the first resource block and the second resource block are interleaved with depth-4, and wherein a virtual resource block index of the first resource block plus 4 is equal to a virtual resource block index of the second resource block.

6. The receiving device according to claim 5, wherein the processor is configured to detect the demodulation reference signals using a scrambling ID or an antenna port allocated to the receiving device.

7. A transmitting device for transmitting a downlink signal in a wireless communication system, the transmitting device comprising:
- a radio frequency (RF) unit configured to transmit signals to a receiving device; and
- a processor configured to:
- control the RF unit,
- allocate demodulation reference signals for demodulating a Physical Downlink Shared Channel (PDSCH) over a first resource block and a second resource block,
- interleave the first resource block and the second resource block with depth 4, and
- transmit a Relay-Physical Downlink Control Channel (R-PDCCH) allocated in the first resource block and the PDSCH in the second resource block to the receiving device,
- wherein the first and second resource blocks include a prescribed number of same consecutive subcarriers,
- wherein the first resource block and the second resource block are interleaved with depth-4, and
- wherein a virtual resource block index of the first resource block plus 4 is equal to a virtual resource block index of the second resource block.

8. The transmitting device according to claim 7, wherein the demodulation reference signals are transmitted using a scrambling ID or an antenna port allocated to the receiving device.

* * * * *